United States Patent
Rubio et al.

(10) Patent No.: US 9,976,225 B2
(45) Date of Patent: May 22, 2018

(54) METHOD FOR OBTAINING A COOKING VESSEL HAVING A COLORED, HARD, ANODIZED OUTER SURFACE

(75) Inventors: Martin Rubio, Rumilly (FR); Stephane Tuffe, Cognin (FR); Aurelien Berrux, La Motte Servolex (FR)

(73) Assignee: SEB S.A., Ecully (FR)

( * ) Notice: Subject to any disclaimer, the term of this patent is extended or adjusted under 35 U.S.C. 154(b) by 858 days.

(21) Appl. No.: 13/885,785

(22) PCT Filed: Nov. 18, 2011

(86) PCT No.: PCT/FR2011/052690
§ 371 (c)(1),
(2), (4) Date: Aug. 15, 2013

(87) PCT Pub. No.: WO2012/066253
PCT Pub. Date: May 24, 2012

(65) Prior Publication Data
US 2013/0313247 A1 Nov. 28, 2013

(30) Foreign Application Priority Data
Nov. 19, 2010 (FR) ..................................... 10 59522

(51) Int. Cl.
*H05B 6/12* (2006.01)
*B32B 9/00* (2006.01)
(Continued)

(52) U.S. Cl.
CPC ............. *C25D 11/18* (2013.01); *A47J 27/002* (2013.01); *A47J 36/02* (2013.01); *A47J 36/025* (2013.01);
(Continued)

(58) Field of Classification Search
CPC ........ A47J 36/02; A47J 27/002; A47J 36/025; B05D 3/0254; B05D 5/083; B05D 7/14; B05D 5/06; B05D 2202/25; B05D 2252/10; B05D 2350/63; C25D 11/022; C25D 11/246; C25D 11/18; H05B 6/1209
(Continued)

(56) References Cited

U.S. PATENT DOCUMENTS 4,328,268 A * 5/1982 Tsuji ........................ B41M 3/12
156/230
8,071,219 B2 12/2011 Berrux et al.
(Continued)

FOREIGN PATENT DOCUMENTS

EP 0424072 A1 4/1991
EP 0902105 A1 3/1999
(Continued)

*Primary Examiner* — Quang Van

(57) ABSTRACT

Provided is a method for obtaining a cooking vessel that includes the following steps: producing a bowl having an aluminum outer surface and an inner surface; performing hard anodization of at least the outer surface of the bowl; and providing a sol-gel coating on the anodized outer surface. At least one coloring step is carried out following the hard anodization, the coloring step(s) being carried out before and/or during the sol-gel coating step. Also provided is a kitchen item or an electrical cooking appliance that includes a cooking vessel obtained by the above method.

20 Claims, 1 Drawing Sheet

(51) Int. Cl.

| | | |
|---|---|---|
| *B32B 19/02* | (2006.01) | |
| *C25D 11/18* | (2006.01) | |
| *A47J 36/02* | (2006.01) | |
| *B05D 3/02* | (2006.01) | |
| *B05D 5/08* | (2006.01) | |
| *B05D 7/14* | (2006.01) | |
| *C25D 11/02* | (2006.01) | |
| *C25D 11/24* | (2006.01) | |
| *A47J 27/00* | (2006.01) | |
| *B05D 5/06* | (2006.01) | |

(52) U.S. Cl.
CPC ........... *B05D 3/0254* (2013.01); *B05D 5/083* (2013.01); *B05D 7/14* (2013.01); *C25D 11/022* (2013.01); *C25D 11/243* (2013.01); *C25D 11/246* (2013.01); *H05B 6/1209* (2013.01); *B05D 5/06* (2013.01); *B05D 2202/25* (2013.01); *B05D 2252/10* (2013.01); *B05D 2350/63* (2013.01)

(58) Field of Classification Search
USPC ........ 219/621, 620, 633, 438; 205/122, 151, 205/50, 201, 202; 99/324, 422, 358; 220/573.1, 573.2; 428/35.7, 34.6, 457, 428/447, 41.2, 156, 207, 689; 524/424
See application file for complete search history.

(56) References Cited

U.S. PATENT DOCUMENTS

| | | |
|---|---|---|
| 2003/0138661 A1 | 7/2003 | Souchard et al. |
| 2006/0251837 A1* | 11/2006 | Cnossen ................. C09D 1/00 428/35.7 |
| 2008/0242774 A1* | 10/2008 | Lahann .................. B82Y 20/00 524/99 |
| 2010/0047556 A1 | 2/2010 | Bockmeyer et al. |
| 2011/0180546 A1* | 7/2011 | Le Bris ................. A47J 36/02 220/573.2 |

FOREIGN PATENT DOCUMENTS

| | | |
|---|---|---|
| EP | 1894502 A1 | 3/2008 |
| GB | 1099486 A | 1/1968 |

\* cited by examiner

METHOD FOR OBTAINING A COOKING VESSEL HAVING A COLORED, HARD, ANODIZED OUTER SURFACE

BACKGROUND OF THE INVENTION

Field of the Invention

The present invention relates to the technical field of cooking appliances and utensils comprising a cooking vessel.

The present invention relates more particularly, but not exclusively, to kitchen items such as casseroles, skillets, or woks, and also to electric cooking appliances comprising a bowl designed for containing foods.

Description of Related Art

Document GB 1 099 486 discloses the production of aluminum cooking vessels having a hard, anodized surface layer. This surface layer may be pigmented if desired. The surface thus obtained is easier to clean than a non-anodized surface. Nevertheless the surface thus obtained is not as easy to clean as a surface coated with a non-stick layer.

Document EP 0 424 072 and document EP 0 902 105 propose the production of cooking vessels having a non-stick coating such as PTFE on a hard anodized aluminum substrate. The hard anodization is thus performed prior to the PTFE coating. This arrangement makes it possible to improve the wear and scratch resistance of the PTFE coating. Typically, the PTFE coating is mainly used to coat the inside surface of cooking vessels, owing to the limited mechanical resistance of this type of coating.

Document EP 1 894 502 discloses the provision of a sol-gel coating on at least one surface of a kitchen item comprising an aluminum or aluminum alloy substrate, wherein this substrate can be an anodized aluminum substrate. This document envisions an anodization layer thickness of between 5 and 100 μm. The other surface can be coated with PTFE if desired. The sol-gel coating makes it possible to improve the dishwasher resistance of the cooking vessel, and also the flame resistance of said cooking vessel.

SUMMARY OF THE INVENTION

An object of the present invention is to propose colorings of the outer anodized surface of a cooking vessel that are of a durable nature.

Another object of the present invention is to propose colorings of the outer anodized surface of a cooking vessel that are resistant to the detergents used in dishwashers.

Another object of the present invention is to propose colorings of the outer anodized surface of a cooking vessel that are able to withstand the flames used for cooking.

An additional object of the present invention is to propose colorings of the outer anodized surface of a cooking vessel that are compatible with a PTFE coating of the inside surface of said cooking vessel.

These objects are achieved with a method for obtaining a cooking vessel comprising the following steps:

producing a bowl with an aluminum outer surface and an inner surface, performing a hard anodization of at least the outer surface of the bowl, providing a sol-gel coating on the anodized outer surface, wherein at least one coloring step is carried out following the hard anodization, the coloring step or steps being carried out before and/or during the sol-gel coating step.

These arrangements make it possible to protect the pigments and/or dyes used in the coloring step or steps by trapping them in the hard anodized layer and/or in the sol-gel coating. A durable coloring is thus obtainable.

According to one embodiment, the coloring step or one of the coloring steps employs a coloring bath comprising inorganic pigments and/or organic pigments and/or organic dyes. A trapping of the pigments and/or dyes in the hard anodized layer is thus achievable owing to the porosity of said hard anodized layer.

According to another embodiment, the sol-gel coating step employs inorganic pigments and/or organic pigments and/or organic dyes for coloring purposes. A trapping of the pigments and/or the dyes in the sol-gel coating is thus achievable.

According to a preferred embodiment, said method comprises a step of providing a PFTE coating on the inner surface of the bowl. The step of providing a PFTE coating may comprise a surface preparation as well as the deposition of one or more intermediate layers if desired. The PTFE coating can in particular be produced by lamination.

According to one embodiment then, the step of performing a hard anodization of the outer surface of the bowl is carried out following the step of providing a PTFE coating on the inner surface of the bowl. The anodization performed following the PTFE coating has the advantage of only anodizing the outer surface of the bowl, thus making it possible to reduce the treatment time and to lower the consumption of current and acid compared to the anodization of the outer surface and of the inner surface of the bowl. Furthermore, PTFE effectively withstands the sulfuric acid bath typically employed to perform the anodization. The coloring performed following the PTFE coating and hard anodization steps allows the use of a broader selection of pigments and/or dyes, in particular organic pigments and/or dyes, as lower temperatures are used for the provision of the sol-gel coating than for the provision of the PTFE coating.

The method optionally comprises a step of performing a preliminary hard anodization of the outer surface and of the inner surface of the bowl prior to the step of providing a PTFE coating on the inner surface of the bowl, the step of performing hard anodization of the outer surface of the bowl being carried out following a step of pickling the outer surface of the bowl subsequent to the step of providing a PTFE coating on the inner surface of the bowl. This preliminary hard anodization treatment involves the inner surface and the outer surface of the bowl and makes it possible to obtain a hard base prior to the provision of the PTFE coating.

According to another embodiment, the step of performing a hard anodization of the outer surface of the bowl is carried out prior to the step of providing a PTFE coating on the inner surface of the bowl. This hard anodization treatment involves the inner surface and the outer surface of the bowl and makes it possible to obtain a hard base prior to providing the PTFE coating. Compared to a preliminary hard anodization treatment followed by a hard anodization of the outer surface after the provision of the PTFE coating, the proposed method enables the number of steps to be reduced, but imposes the use of pigments or dyes capable of resisting the temperatures encountered during the provision of the PTFE coating, namely inorganic pigments. The choice of colors is then reduced further.

This object is also achieved with a cooking vessel obtained according to a method complying with at least one of the aforementioned features.

According to an advantageous embodiment, the bowl is obtained by the stamping of a substrate having at least one aluminum surface, which surface then forms the outer surface of the bowl.

According to one embodiment then, the substrate has two aluminum surfaces. The substrate can in particular be made of solid aluminum, or of a colaminate having two aluminum surfaces and a steel core. The steel can be chosen from among the stainless steels if desired.

According to another embodiment then, the substrate is formed by a colaminate having an aluminum surface and a stainless steel surface, said stainless steel surface being advantageously designed to be provided with a PTFE coating.

According to another advantageous embodiment, the bowl is made of die-cast aluminum.

According to an advantageous embodiment, the outer surface of the bowl has a brushed or micro-blasted surface. The anodization treatment is a surface treatment in which the surface material is modified, and not a surface coating in which one or more layers are added to an existing surface. The hard anodization treatment is not limited to smooth or polished surface states; in particular an anodization on a brushed or micro-blasted surface is conceivable.

In order to obtain an induction compatible cooking vessel, the bowl advantageously comprises at least one insert made of a ferromagnetic material.

This object is also achieved with a kitchen item comprising a cooking vessel and a handle attached to said cooking vessel by at least one rivet or by welding, said cooking vessel complying with at least one of the aforementioned features.

This object is also achieved with an electric cooking appliance comprising a cooking vessel associated with heating means, said cooking vessel complying with at least one of the aforementioned features.

BRIEF DESCRIPTION OF THE DRAWINGS

The invention will be more clearly understood by studying examples of embodiment, which are in no way limiting and illustrated in the appended figures, wherein.

DETAILED DESCRIPTION OF THE INVENTION

Figure 1:
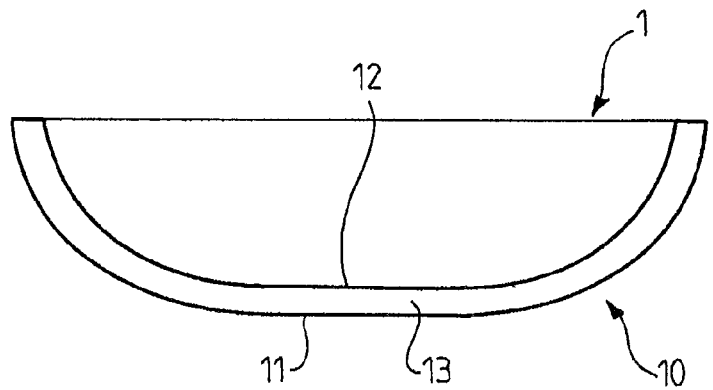
FIG. 1 illustrates a cooking vessel 1 of the invention.
Figure 2:
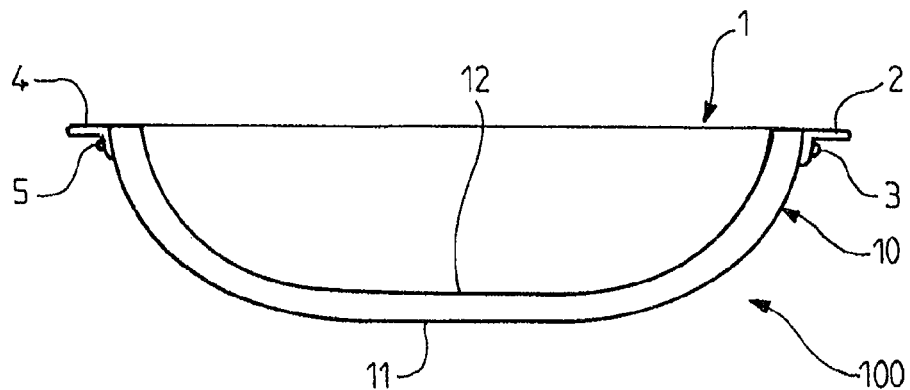
FIG. 2 illustrates a kitchen item 100 comprising a cooking vessel 1 of the invention.

The cooking vessel 1 illustrated in FIGS. 1 and 2 comprises a bowl 10 having an aluminum outer surface 11 as well as an inner surface 12.

According to an embodiment, the bowl 10 is obtained by the stamping of a substrate 13 having at least one aluminum surface designed to form the outer surface 11 of the bowl 10.

According to an embodiment, the substrate 13 has two aluminum surfaces designed to form the outer surface 11 and the inner surface 12, respectively, of the bowl 10.

The substrate 13 can optionally be made of solid aluminum. In particular an aluminum alloy 3003 can be used to this end. The substrate 13 used to produce the bowl 10 is then cut in an aluminum sheet.

According to another embodiment, the substrate 13 is formed by a colaminate having an aluminum surface and a stainless steel surface, the aluminum surface being designed to form the outer surface 11 of the bowl and the stainless steel surface being designed to form the inner surface 12 of the bowl 10.

According to another embodiment, the bowl 10 is made of die-cast aluminum, for example with an AlSi12 alloy.

Optionally, the outer surface 11 of the bowl 10 is not necessarily smooth or polished, but can in particular have a brushed or micro-blasted surface.

The bowl 10 can optionally comprise at least one insert made of a ferromagnetic material such as ferritic steel in order to produce a cooking vessel 1 capable of being heated by induction. Preference is given to the ferromagnetic material being a ferritic stainless steel. Optionally, the insert made of a ferromagnetic material can be formed by a plate having one or more perforations. The insert is advantageously assembled by hot or cold stamping with the aluminum of the substrate 13 or is coated with cast aluminum, the perforation or perforations preferably being filled by the aluminum. The insert made of ferromagnetic material can have at least one visible part, which is necessary to protect by masking in the acidic chemical baths, specifically the anodization bath or baths.

The cooking vessel 1 of the invention is produced according to a method comprising the following steps:

producing a bowl 10 having an aluminum outer surface 11 and an inner surface 12, performing a hard anodization of at least the outer surface 11 of the bowl 10, providing a sol-gel coating on the anodized outer surface 11, wherein at least one coloring step is carried out following the hard anodization, the coloring step or steps being carried out before and/or during the sol-gel coating step.

More precisely, said coloring step or steps carried out following the hard anodization is/are carried out on the anodized outer surface following the hard anodization of said anodized outer surface.

The method advantageously comprises a step of providing a PTFE coating on the inner surface of the bowl. The step of providing the PTFE coating can in particular be carried out by lamination. If desired, a filled PTFE can be used in the step of providing the PTFE coating in order to improve the resistance of the PTFE-coated inner surface 12 of the bowl 10. In particular, use can be made of mineral particles as a reinforcement filler. To obtain the PTFE cooking surface, the PTFE coating is heated to a temperature above 400° C. (typically around 420° C.).

According to an embodiment, the step of performing a hard anodization of the outer surface 11 of the bowl 10 is carried out before the step of providing a PTFE coating on the inner surface 12 of the bowl 10. The obtaining of a PTFE coating following hard anodization is disclosed specifically in document EP 0 902 105. This arrangement makes it possible to obtain a hard base, thus improving the mechanical resistance of the PTFE coating. However, the temperatures necessary for the finishing of the PTFE coating limit the coloring possibilities, as few colored products are able to withstand the aforementioned temperatures.

According to another embodiment, the step of performing a hard anodization of the outer surface 11 of the bowl 10 is carried out following the step of providing the PTFE coating on the inner surface 12 of the bowl 10. An advantage of this embodiment resides in the possibility of using a broader selection of colored products, not only inorganic pigments but also organic pigments or organic dyes.

Optionally, a step of performing a preliminary hard anodization of the outer surface 11 and of the inner surface 12 of the bowl 10 is conceivable prior to the step of providing a PTFE coating on the inner surface 12 of the bowl 10. This preliminary hard anodization treatment enables a hard base under the PTFE coating to be obtained. However, a pickling of the outer surface 11 of the bowl 10 is then required in order to re-anodize said outer surface 11 before proceeding with a coloring step, unless this coloring step is limited to the use of a colored sol-gel coating. The step of performing a hard anodization of the outer surface 11 of the bowl 10 is then carried out following a step of pickling the outer surface 11 of the bowl 10 subsequent to the step of providing a PTFE coating on the inner surface 12 of the bowl 10.

A surface preparation before the hard anodization can optionally comprise an acidic or alkaline degreasing and/or an acidic or alkaline pickling and/or a nitric acid neutralization. A degreasing of a few minutes in a bath of NaOH at a concentration of 50 g/l at a temperature of around 50° C. gives satisfactory results.

The hard anodization treatment can in particular be performed by dipping in a bath. The preliminary anodization treatment can also be performed by dipping in a bath. The hard anodization has the advantage of good resistance to scratches and blows. Compared to enameling, a broader selection of materials is thus conceivable for producing the bowl 10 without sacrificing the cleaning properties conferred by the PTFE coating of the inner surface 12 of the bowl 10.

The hard anodization is achievable with, for example, a bath of $H_2SO_4$ at a concentration of 130 g/l for 90 min at a temperature of around 10° C. with a current density of around 1.8 $A/dm^2$. Lower temperatures of around 0° C. with a higher current density enable the treatment time to be reduced.

A hard anodized layer with a thickness of between 10 μm and 30 μm has a hardness of around 350 Hv and gives satisfactory results in terms of both durability and coloring options.

According to a preferred feature, the anodized outer surface 11 has pores smaller than 30 nm and preferably smaller than 20 nm in size.

According to an embodiment, the coloring step employs, for example, a coloring bath comprising inorganic pigments and/or organic pigments and/or organic dyes. Inorganic pigments (such as, for example, yellow Orminal Gold4N from Clariant) have good resistance to temperatures that can exceed 300° C. or even 400° C. Certain inorganic pigments are therefore suitable for the coloring of the outer surface 11 of the bowl 10 prior to the provision of a PTFE coating of the inner surface 12 of the bowl 10. Organic pigments and/or organic dyes are typically less resistant to high temperatures than inorganic pigments; however, the selections of available colors are broader for organic pigments and organic dyes than for inorganic pigments. Colors such as yellow, green, red, chestnut, blue, or light brown can thus be obtained. Organic pigments and/or organic dyes are more suitable for the coloring of the outer surface 11 of the bowl 10 following the provision of the inner surface 12 of the bowl 10 with a PTFE coating.

The coloring of the hard anodization layer is obtainable with metallic salts composed of at least one metal ion and a counter ion. Preference is given to the selection of metal ions from among the transition metals. The counter ions, or ligands, are perfectly soluble in aqueous or solvent media and facilitate the penetration of the metal ions into the pore structure of the hard anodization layer. The metal ions are subsequently oxidized by a standard heat treatment in order to obtain an oxide that develops the desired hue. The titration and type of metal salts used will vary according to the desired hue and coloring power, but also according to the handling and storage facilities, and the cost.

The method comprises a step of providing a sol-gel coating on the anodized outer surface. The sol-gel coating step is carried out following the step of hard anodization of the outer surface 11 of the bowl 10. By conferring better flame resistance to the outer surface 11 of the bowl 10, this sol-gel coating allows the use of a broader selection of pigments and/or dyes, in particular organic pigments or organic dyes. This sol-gel coating also makes it possible to obtain a cooking vessel capable of resisting detergents used in dishwashers. In particular, the sol-gel coating can be provided according to the method described in document EP 1 894 502. Preference is given to a temperature of around 300° C. for the baking of the sol-gel coating. This temperature makes it possible to confer good compactness properties to the sol-gel coating, thus rendering it resistant to abrasion, flame, and dishwashers. This temperature is not excessive and will not degrade the PTFE. This temperature is likewise compatible with the use of organic pigments and/or organic dyes.

Optionally, the sol-gel coating step can employ inorganic pigments and/or organic pigments and/or organic dyes for coloring purposes, wherein only one type of dye or pigment can be used. The sol-gel coating can thus be colored by adding pigments and/or dyes in order to obtain the desired coloring, alternatively or in addition to the coloring step between the hard anodization of the outer surface 11 of the bowl 10 and the sol-gel coating of the hard anodized outer surface 11 of the bowl 10.

The PTFE coating step and the sol-gel coating step may optionally comprise at least one common baking.

The method of the invention can comprise the following examples of embodiment in particular:

EXAMPLE 1

PTFE coating of the inner surface 12, hard anodization of the outer surface 11, coloring of the hard anodized outer surface 11, transparent sol-gel for coating the colored, hard anodized outer surface 11.

EXAMPLE 2

PTFE coating of the inner surface 12, hard anodization of the outer surface 11, colored sol-gel for coating the hard anodized outer surface 11.

EXAMPLE 3

PTFE coating of the inner surface 12, hard anodization of the outer surface 11, coloring of the hard anodized outer surface 11, colored sol-gel for coating the colored, hard anodized outer surface 11.

EXAMPLE 4 preliminary hard anodization of both surfaces of the bowl 10 in order to obtain a hard base, PTFE coating of the inner surface 12, hard anodization of the outer surface 11, coloring of the hard anodized outer surface 11, transparent sol-gel for coating the colored, hard anodized outer surface 11.

EXAMPLE 5 preliminary hard anodization of both surfaces of the bowl 10 in order to obtain a hard base, PTFE coating of the inner surface 12, colored sol-gel for coating the hard anodized outer surface 11.

EXAMPLE 6 preliminary hard anodization of both surfaces of the bowl 10 in order to obtain a hard base, PTFE coating of the inner surface 12, hard anodization of the outer surface 11, coloring of the hard anodized outer surface 11, colored sol-gel for coating the colored, hard anodized outer surface 11.

EXAMPLE 7 hard anodization of both surfaces of the bowl 10 in order to obtain a hard base, coloring of the hard anodized outer surface 11 and inner surface 12, PTFE coating of the inner surface 12, transparent sol-gel for coating the colored, hard anodized outer surface 11.

EXAMPLE 8 hard anodization of both surfaces of the bowl 10 in order to obtain a hard base, coloring of the hard anodized outer surface 11 and inner surface 12, PTFE coating of the inner surface 12, colored sol-gel for coating the colored, hard anodized outer surface 11.

EXAMPLE 9 hard anodization of both surfaces of the bowl 10 in order to obtain a hard base, coloring of the hard anodized outer surface 11 and inner surface 12, PTFE coating of the inner surface 12, hard anodization of the outer surface 11, coloring of the hard anodized outer surface 11, colored sol-gel for coating the colored, hard anodized outer surface 11.

EXAMPLE 10 hard anodization of both surfaces of the bowl 10 in order to obtain a hard base, coloring of the hard anodized outer surface 11 and inner surface 12, transparent sol-gel for coating the colored, hard anodized outer surface 11.

EXAMPLE 11 hard anodization of both surfaces of the bowl 10 in order to obtain a hard base, coloring of the hard anodized outer surface 11 and inner surface 12, colored sol-gel for coating the colored, hard anodized outer surface 11.

EXAMPLE 12 hard anodization of both surfaces of the bowl 10 in order to obtain a hard base, colored sol-gel for coating the colored, hard anodized outer surface 11.

FIG. 2 illustrates a kitchen item 100 comprising a cooking vessel 1 and a handle 2 attached to said cooking vessel 1 by at least one rivet 3. To this end, the rivet 3 is inserted in a hole bored in the bowl 10 of the cooking vessel 1. If desired, use can be made of a plurality of rivets 3 for attaching the handle 2 to the cooking vessel 1. Preference is given to the use of between two and four rivets 3 for attaching the handle 2 to the cooking vessel 1. Alternatively, the handle 2 could be attached to said cooking vessel 1 by welding. If desired, another handle 4 can be attached to said cooking vessel 1 by at least one other rivet 5 or by welding.

Figure 3:
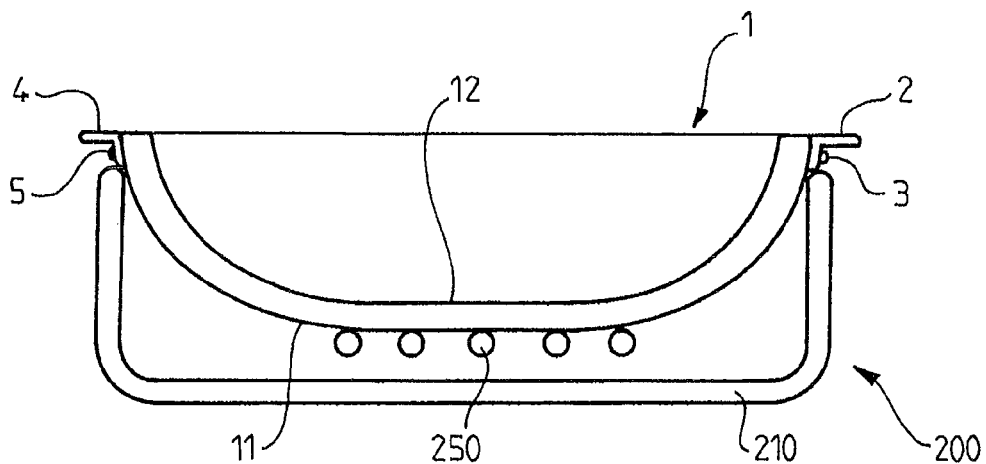
FIG. 3 schematically illustrates an electric cooking appliance 200 comprising a cooking vessel 1 of the invention.

FIG. 3 illustrates an electric cooking appliance 200 comprising a cooking vessel 1 associated with heating means 250. The cooking vessel 1 forms a bowl positioned in a heating base 210 comprising the heating means 250. The outer surface 11 of the bowl 10 rests on the heating means 250. The outer surface 11 can be integrally formed with heating means 250 if desired.

Alternatively, the inner surface 12 of the bowl 10 is not necessarily coated with PTFE, other types of coating are optionally conceivable.

Alternatively, the inner surface 12 of the bowl 10 is not necessarily coated. In particular, the inner surface 12 of the bowl 10 can be polished if desired.

The present invention is in no way limited to the examples of embodiment described herein, but encompasses numerous modifications in the scope of the claims.

The invention claimed is:

1. Method for obtaining a cooking vessel, comprising the following steps:
   producing a bowl having an aluminum outer surface and an inner surface,
   performing a hard anodization of at least the outer surface of the bowl,
   providing a sol-gel coating on the anodized outer surface, wherein at least one coloring step is carried out on the anodized outer surface following the hard anodization before the sol-gel coating step,
   wherein the coloring step comprises trapping inorganic pigments and/or organic pigments and/or organic dyes in a pore structure of the hard anodized layer, and
   wherein said method comprises a step of providing a PTFE coating on the inner surface of the bowl, and further wherein the step of performing a hard anodization of the outer surface of the bowl is carried out following the step of providing a PTFE coating on the inner surface of the bowl.

2. Method for obtaining a cooking vessel as in claim 1, wherein the coloring step or one of the coloring steps employs a coloring bath comprising inorganic pigments and/or organic pigments and/or organic dyes.

3. Method for obtaining a cooking vessel as in claim 1, wherein said method comprises a step of performing a preliminary hard anodization of the outer surface and the inner surface of the bowl prior to the step of providing a PTFE coating on the inner surface of the bowl and further wherein the step of performing a hard anodization of the outer surface of the bowl is carried out following a step of pickling the outer surface of the bowl subsequent to the step of providing a PTFE coating on the inner surface of the bowl.

4. Cooking vessel obtained from a method comprising:
   producing a bowl having an aluminum outer surface and an inner surface,
   performing a hard anodization of at least the outer surface of the bowl,
   providing a sol-gel coating on the anodized outer surface, wherein at least one coloring step is carried out on the anodized outer surface following the hard anodization before the sol-gel coating step,
   wherein the coloring step comprises trapping inorganic pigments and/or organic pigments and/or organic dyes in a pore structure of the hard anodized layer, and
   wherein said method comprises a step of providing a PTFE coating on the inner surface of the bowl, and further wherein the step of performing a hard anodization of the outer surface of the bowl is carried out following the step of providing a PTFE coating on the inner surface of the bowl.

5. Cooking vessel as in claim 4, wherein the bowl is obtained by the stamping of a substrate having at least one aluminum surface.

6. Cooking vessel as in claim 5, wherein the substrate has two aluminum surfaces.

7. Cooking vessel as in claim 5, wherein the substrate is made of solid aluminum.

8. Cooking vessel as in claim 5, wherein the substrate is formed by a colaminate having an aluminum surface and a stainless steel surface.

9. Cooking vessel as in claim 4, wherein the bowl is made of die-cast aluminum.

10. Cooking vessel as in claim 4, wherein the outer surface of the bowl has a brushed or micro-blasted surface.

11. Cooking vessel as in claim 4, wherein the bowl comprises at least one insert made of a ferromagnetic material.

12. Kitchen item comprising a cooking vessel according to claim 4 and a handle attached to said cooking vessel by at least one rivet or by welding.

13. Electric cooking appliance comprising a cooking vessel according to claim 4 that is associated with a heating means.

14. A cooking vessel comprising a bowl having an aluminum outer surface and an inner surface, a hard anodization layer formed on at least the aluminum outer surface of the bowl, a sol-gel coating layer formed outside the hard anodization layer on the outer surface of the bowl, wherein the cooking vessel further comprises at least one coloring layer formed between the hard anodization layer and the sol-gel coating layer, and wherein the coloring layer comprises inorganic pigments and/or organic pigments and/or organic dyes trapped in a pore structure of the hard anodized layer, and wherein a PTFE coating is formed on the inner surface of the bowl prior to formation of the hard anodization layer on the outer surface of the bowl.

15. The cooking vessel as in claim 14, wherein the bowl is obtained by the stamping of a substrate having at least one aluminum surface.

16. The cooking vessel as in claim 14, wherein the bowl is made of die-cast aluminum.

17. The cooking vessel as in claim 14, wherein the outer surface of the bowl has a brushed or micro-blasted surface.

18. The cooking vessel as in claim 14, wherein the bowl comprises at least one insert made of a ferromagnetic material.

19. Kitchen item comprising a cooking vessel according to claim 14 and a handle attached to said cooking vessel by at least one rivet or by welding.

20. Electric cooking appliance comprising a cooking vessel according to claim 14 that is associated with a heating means.

* * * * *